3,108,019
METHOD OF STABILIZING THE ELECTRICAL RESISTANCE OF A METAL OXIDE FILM

James K. Davis, Corning, N.Y., assignor to Corning Glass Works, Corning, N.Y., a corporation of New York
No Drawing. Filed Feb. 14, 1958, Ser. No. 715,213
3 Claims. (Cl. 117—201)

This invention relates to electroconductive, metal oxide films and, more particularly, to a method of stabilizing the electrical resistance of such films for operation at elevated temperatures.

It is well known to produce such films on a glass or ceramic insulating base by an iridizing process. In accordance with conventional practice, a glass or other refractory substrate is heated to a temperature on the order of 500°–700° C. and contacted, while so heated, with the vapor or atomized solution of a selected hydrolyzable material to produce on its surface a thin, strongly adherent, electroconductive film. Materials and mixtures, taught by the prior art as suitable for producing such films, include the chlorides, bromides, iodides, sulfates, nitrates, oxalates, and acetates of tin, indium, cadmium, tin and antimony, tin and indium, or tin and cadmium either with or without a similar hydrolyzable or other compound of a modifying metal such as zinc, iron, copper or chromium. The prior art also teaches the use of a wide variety of organo-metal compounds for producing such films. The film itself consists of the corresponding metal oxide or oxides.

The present invention is generally applicable to stabilization of all such metal oxide films regardless of composition or manner of production and is not to be construed as being restricted to any particular film or method of production. Accordingly, reference is made to the prior art, as exemplified by U.S. Patent No. 2,564,707, for further details regarding film production and composition.

It is well known in the electrical art to employ metal oxide films as resistance elements in resistance or heating devices, such as resistors, heated windows, warming trays, space heaters and the like, which attain an elevated temperature in operation. A film may be useful over a wide range of temperatures, e.g. up to 500° C. However, it is common practice in the art to define the electrical characteristics of a film, and otherwise refer to it, in terms of a specified maximum operating temperature. That is the maximum temperature at which the film is expected to operate, or to be subjected to in the course of operation in the particular product or manner of use involved. This practice has arisen largely because many film properties, and the extent to which they may vary or fluctuate, are apreciably dependent on temperature. In this application then the term "operating temperature" is used in a generic sense and in accordance with this customary usage of the art. As such it will be fully understood by those working in the art.

It has been observed that conducting films of this type tend to be electrically unstable, that is to undergo changes in electrical resistance during operation in service, and that such tendency becomes more pronounced as the operating temperature is increased.

Various external influences have been found to affect the resistance value of a film and proposals have been made regarding use of particular substrates and coatings to provide protection against these influences. In addition to these external effects, however, fluctuations occur which appear to be an inherent result of either the film forming process or of subsequent treatment. The present invention is directed at a remedial measure for this latter type of instability.

I have found that rather large resistance increases of a temporary nature may be induced in films during extended heat treatments at temperatures on the order of 500° C. or more. Such resistance increases may be occasioned by heat treatment of a device to fire on electrical contacts, e.g. decomposing a metal compound or fusing a bonding frit. They may also result from preliminary heating of a filmed glass sheet or other body for tempering by chilling. In either event temperatures on the order of 500°–750° C. may be reached and maintained for some indefinite time interval, during which resistance increases of a few percent up to as much as 60% may occur depending on the severity of the thermal treatment and the nature of the film.

To the extent that such increases are released in service, the change occurs gradually so that after a few hundred hours service an apparent equilibrium resistance is reached for the particular operating temperature involved. However, it is quite impractical to operate electrical elements for a period of several hundred hours before determining their resistance rating. There has then been a definite need for a method of either avoiding or accelerating this change in resistance so that a resistance element capable of stable operation at a specified elevated temperature may be provided. It is a primary purpose of this invention to supply this need.

The present invention is based on my discovery that temporary increases in film resistance, induced by high temperature thermal treatment, may be substantially released within a reasonably short time by a further controlled type of heat treatment. It resides in a method of improving the electrical stability of an electroconductive metal oxide film at an elevated operating temperature which comprises heat treating the film at a temperature above the operating temperature to decrease the electrical resistance of the film. The stabilizing treatment is carried out at a temperature intermediate that of the prior thermal treatment and the specified ultimate operating temperature for the film. In general optimum rate of release occurs at a stabilizing temperature of 300° C. or higher and on the order of 50–100° C. above the operating temperature.

The operating temperature or maximum temperature which a film will attain in actual service is generally specified for any electrical product embodying a resistance element of this type. Thus, filmed glass panels designed as heating elements in domestic space heaters or in industrial heating or drying units may operate at and be rated for temperatures on the order of 250°–450° C. depending on the particular type of panel. Resistors on the other hand are generally referred to in terms of the hot spot temperature, that is the highest temperature which any portion of the resistor attains during operation. In precision type resistors this temperature will be on the order of 100–200° C. depending on the rating of the resistor. In power type resistors the specified hot spot temperature frequently is on the order of 350° C. It will be appreciated of course that the present invention is not restricted to a particular operating temperature, or range of temperatures, and that the temperatures recited above are merely illustrative of those encountered in typical products employing film type resistance elements.

I have further discovered that thermal reduction of an unstable high film resistance to a more stable value is facilitated by a mildly reducing atmosphere. In particular, introduction of water vapor into the heat treating atmosphere, or the use of a steam atmosphere, is very effective and provides a readily controllable type of atmosphere. A slight dissociation to form hydrogen apparently provides an adequate degree of reduction for present purposes. It has also been found that a commercially available mixture of 92% $N_2$–8% $H_2$ is effective but not as readily controlled. Alternatively heat treating the film in a vacuum facilitates resistance decrease or release.

These various findings indicate that a metal oxide film tends to reach an equilibrium resistance value at any given temperature, and that these equilibria values increase markedly with increase in temperature. Also the rate at which equilibrium is approached increases sharply with temperature. Thus a large increase in resistance might be induced in a few minutes at 700° C.–800° C., but released over a period of a hundred hours or more at a 200° C. operating temperature. However, at intermediate temperatures of 300°–400° C. the approach to an equilibrium value for that temperature is much more rapid than at 200° C. Thus release of resistance, although somewhat smaller than the total amount desired, is effected in a short time at such intermediate temperatures.

By way of further illustrating the present invention and the effects that may be achieved on electroconductive metal oxide films geenrally through its practice, the following exemplary test results are presented:

EXAMPLE I

Substantially identical, flat strips or plates of glass were heated to a temperature of 650° C. and sprayed with an acid solution of metal chlorides for a time sufficient to produce thin metal oxide coatings ranging from 1st order red to 2nd order blue in thickness. These thickness measurements were based on observable interference colors exhibited by the films, a recognized means of measuring film thickness.

The iridizing solution components were mixed on the proportional basis of 100 grams $SnCl_4 \cdot 5H_2O$, 4 grams $SbCl_3$, 1 gram $ZnCl_2$, 50 cc. $H_2O$ and 10 cc. HCl. The film composition, as calculated from the iridizing solution, was 93.2% $SnO_2$, 5.5% $Sb_2O_3$, and 1.3% ZnO.

Three of the filmed pieces thus produced were then heat treated for 10 minutes at 700° C. to impart an unstable high resistance typical of that encountered in an operation such as tempering. Each test piece was then given a separate stabilizing treatment at 350° C. One plate was baked in air for 15 minutes at a stabilizing temperature of 350° C.; another was baked for 15 minutes at that temperature in a steam atmosphere; the third was electrically heated to 350° C. in air having a water vapor pressure of 55 mm. for 30 minutes. After measurement of the resistance of the films, the 3 test pieces were then operated under typical service conditions at 250° C. to determine what further change in resistance might occur before an equilibrium resistance was achieved at this temperature. Resistance values, measured in ohms in the course of the test are shown in the table below with the test pieces being identified by the type of stabilizing treatment:

*Table I*

| Test Piece | Stabilizing Treatment | $R_1$ | $R_2$ | $R_3$ | $R_4$ |
|---|---|---|---|---|---|
| 1 | Air | 115.0 | 171.0 | 131.3 | 111.3 |
| 2 | Steam | 110.9 | 183.9 | 102.2 | 110.5 |
| 3 | Electrically Heated | 125.6 | 204.9 | 131.7 | 125.0 |

$R_1$—Initial film resistance after spraying.
$R_2$—Resistance after 700° C. heat treatment.
$R_3$—Resistance after indicated stabilizing treatment.
$R_4$—Equilibrium resistance achieved after service operation at 250° C.

The high temperature heat treatment induced resistance increases varying from 48 to 66%. However, over two-thirds of this increase was released by a 15 minute stabilizing treatment in air. Furthermore, either electric heating or water vapor in the atmosphere was effective in further releasing the resistance increase, as indicated. In fact, with steam the resistance was decreased below its initial value, followed by a return in service. This result is not generally desirable and is merely included to illustrate the degree of change that can be effected. It will be aparent that close control on the resistance drop can be insured by use of a controlled time-temperature cycle and/or controlled steam concentration or pressure.

EXAMPLE II

Glass cane, having a diameter of about ¼ inch, was exposed, while being drawn, and at a temperature of 650°–700° C., to fumes generated from a molten mixture of 95.5% $SnCl_4 \cdot 5H_2O$ and 4.5% $SbCl_3$. The exposure time was selected to produce a corresponding $SnO_2$—$Sb_2O_3$ film of second order red to third order green thickness and having resistance values within a range of 48–65 ohms per square.

The coated cane was cut into short lengths, spiralled at 5.5 turns per inch and provided with silver paste terminals fired at 510° C. for 20 minutes to fuse the silver flux and bond it to the glass cane base member. The resistors thus produced were of a commercial type designed to operate at a hot spot, or maximum surface, temperature of 200° C. Three of the resistors were given a so-called vacuum stabilizing treatment which consisted in baking them at 300° C. for 30 minutes at a pressure of approximately 0.06 mm. An additional three were selected for comparison purposes and were untreated.

The six resistors were given a standard load life test in which the samples were operated under simulated service conditions for a period of approximately 500 hours, to determine what degree of change in electrical resistance might be expected during service life. The resistance of each resistor, in ohms, was measured before and after the test and the observed values, identified respectively as $R_0$ and $R_1$, are as follows:

*Table II*

| Example | Stabilized | | Unstabilized | |
|---|---|---|---|---|
| | $R_0$ | $R_1$ | $R_0$ | $R_1$ |
| 1 | 2,248 | 2,295 | 1,971 | 1,862 |
| 2 | 2,285 | 2,291 | 1,962 | 1,853 |
| 3 | 2,273 | 2,278 | 1,962 | 1,828 |
| Average | 2,269 | 2,288 | 1,965 | 1,848 |

It will be seen that the unstabilized set decreased about 6% on the average, thus indicating that an unstable resistance increase of this magnitude had been imparted during previous thermal treatment. This is of the order of magnitude encountered with terminal firing at 500–550° C. The stabilized group, by comparison, increased only about 0.84% on the average, thus indicating a rather slight over stabilization. If desired this condition can be readily corrected by decreasing the stabilizing time or temperature. This test is indicative of the degree of improvement attainable through practice of the present invention in a typical commercial product.

It will be appreciated that the stabilization method of the present invention is generally applicable to known electroconductive metal oxide films regardless of their chemical compositions, the nature of their ultimate use as a resistance element, or the operating temperature in such use. Accordingly, the present invention does not relate to either new film compositions or new methods of film formation and is not to be construed as limited in either respect.

What is claimed is:

1. A method of producing an electrical resistance element adapted to operate at a predetermined temperature which comprises forming an electroconductive metal oxide film on a substrate, subjecting the film to a high temperature heat treatment that imparts an abnormally high, unstable resistance value to the film, thereafter accelerating the rate at which the electrical resistance of the film decreases from the abnormally high value to a value that is more nearly stable at the intended operating temperature by subjecting the film to a second heat treatment in a mildly reducing atmosphere and at a temperature intermediate the intended operating temperature of the resistance element and the temperature of the initial heat treatment, and discontinuing this second heat treatment when the desired accelerated decrease has been achieved, thereby producing a resistance element having a more stable resistance at its intended operating temperature.

2. A method in accordance with claim 1 wherein the heat treating step is conducted in an atmosphere composed in part at least of steam.

3. A method in accordance with claim 1 wherein the heat treating step is conducted under conditions of reduced pressure.

References Cited in the file of this patent

UNITED STATES PATENTS

| | | |
|---|---|---|
| 1,446,720 | Parker | Feb. 27, 1923 |
| 2,329,511 | Christensen | Sept. 14, 1943 |
| 2,564,707 | Mochel | Aug. 21, 1951 |
| 2,597,562 | Blodgett | May 20, 1952 |